United States Patent
Wiecek et al.

(10) Patent No.: US 11,657,965 B2
(45) Date of Patent: May 23, 2023

(54) CONFIGURATIONS FOR COOLING CAPACITORS

(71) Applicant: Halliburton Energy Services, Inc., Houston, TX (US)

(72) Inventors: Boguslaw Wiecek, Kingwood, TX (US); Nagaraja K. Pai, Lancaster, PA (US)

(73) Assignee: Halliburton Energy Services, Inc., Houston, TX (US)

( * ) Notice: Subject to any disclaimer, the term of this patent is extended or adjusted under 35 U.S.C. 154(b) by 106 days.

(21) Appl. No.: 17/303,320

(22) Filed: May 26, 2021

(65) Prior Publication Data

US 2022/0384105 A1    Dec. 1, 2022

(51) Int. Cl.
*H01G 2/08*    (2006.01)
*E21B 41/00*   (2006.01)
*E21B 36/00*   (2006.01)

(52) U.S. Cl.
CPC ............. *H01G 2/08* (2013.01); *E21B 36/001* (2013.01); *E21B 41/0085* (2013.01)

(58) Field of Classification Search
CPC ...... E21B 41/0085; E21B 36/001; E21B 7/15; H02G 2/08
See application file for complete search history.

(56) References Cited

U.S. PATENT DOCUMENTS

| 8,955,657 | B2 * | 2/2015 | Osara | B60L 53/20 |
| | | | | 191/33 R |
| 10,128,044 | B2 * | 11/2018 | Tan | H01G 4/005 |
| 2012/0176138 | A1 | 7/2012 | Prammer | |
| 2019/0316419 | A1 * | 10/2019 | Bayol | E21B 41/0085 |

FOREIGN PATENT DOCUMENTS

| CN | 205406294 U | 7/2016 |
| CN | 207134237 U | 3/2018 |
| KR | 20120019845 | 3/2012 |

OTHER PUBLICATIONS

"PCT Application No. PCT/US2021/070619, International Search Report and Written Opinion", dated Feb. 17, 2022, 10 pages.

* cited by examiner

*Primary Examiner* — Nicole Coy
(74) *Attorney, Agent, or Firm* — Delizio, Peacock, Lewin & Guerra

(57) ABSTRACT

A configuration for cooling capacitors comprises a flow tube within a tool body of a pulse power drilling assembly. The flow tube is configured to provide a flow path for drilling fluid through one or more sub-assemblies of the pulse power drilling assembly. One or more capacitors are positioned between the flow tube and the tool body. Each of the one or more capacitors comprises a cooling tube embedded within the capacitor to provide a thermally conductive path for removal of heat associated with the one or more capacitors. Cooling capacitors comprises providing a flow of cooling fluid to a cooling tube embedded in a capacitor in the pulse power drilling assembly.

20 Claims, 10 Drawing Sheets

CONFIGURATIONS FOR COOLING CAPACITORS

TECHNICAL FIELD

The disclosure generally relates to pulse power drilling and, more particularly, to capacitor configurations for pulse power drilling assemblies.

BACKGROUND

Pulse power or electro-crushing drilling occurs when portions of formation material, such as subterranean formation material, which are positioned in the vicinity of one or more electrodes of a pulse power drilling apparatus are pulverized and/or otherwise physically altered by the emission of high-voltage bursts of electricity, or electric impulses, emitted by the one or more electrodes of a pulse power drilling apparatus. These electric impulses can cause plasma formation, vaporization of fluid within the formation strata, physical failure, and sonic destruction of the formation at the electrode(s) of the pulse power drilling assembly, which in turn can advance a borehole into and/or through layers of foundation material. Electric energy may be generated by the pulse power drilling assembly for discharge at the one or more electrodes in order to advance a borehole into the formation. Capacitors may be used in pulse power drilling assemblies to store electrical energy and aid in supplying large pulses of current to the electrodes.

BRIEF DESCRIPTION OF THE DRAWINGS

Embodiments of the disclosure may be better understood by referencing the accompanying drawings.

Figure 1:
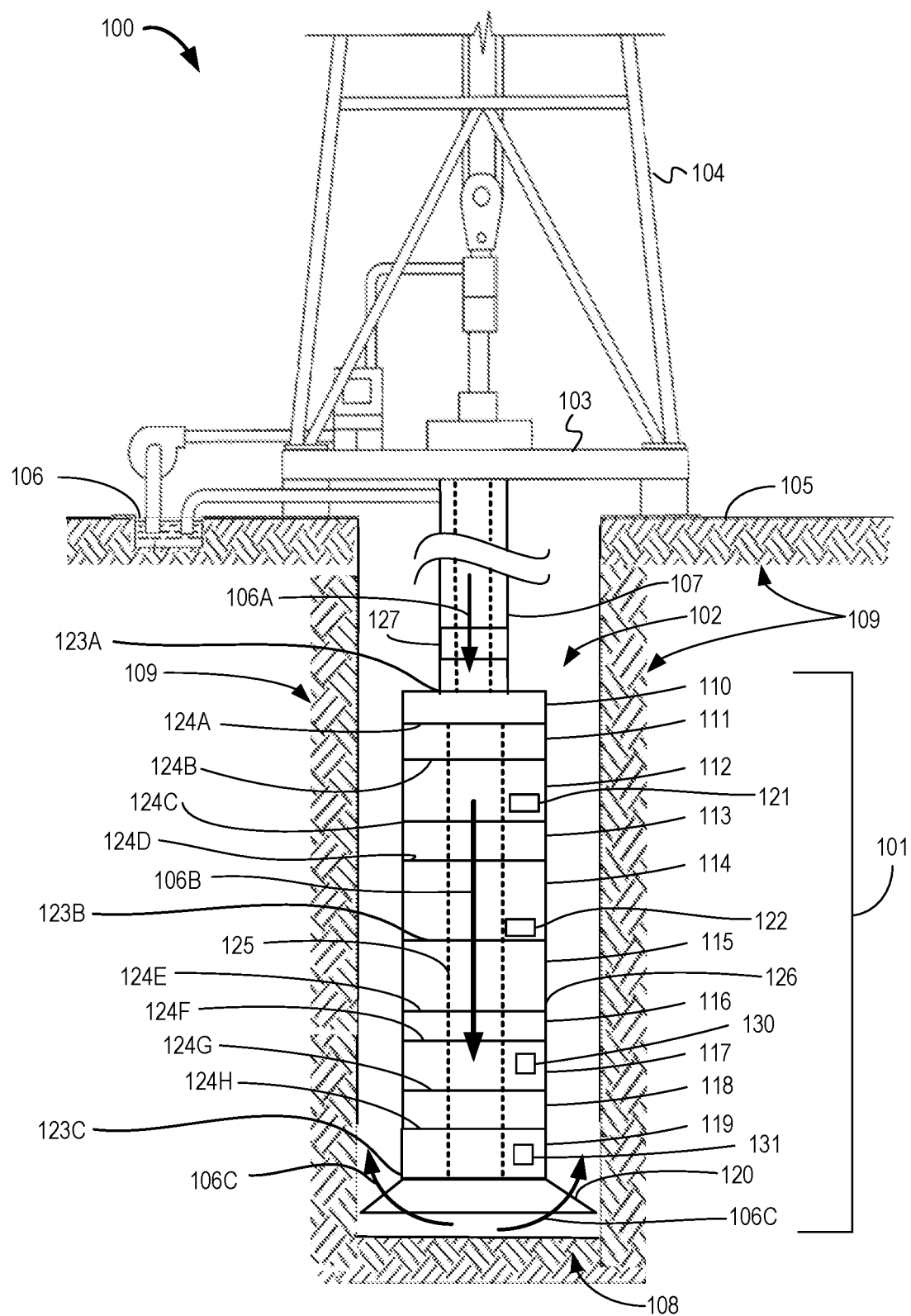
FIG. 1 illustrates a pulse power drilling system including a pulse power drilling assembly, according to various embodiments.

The description that follows includes example systems, methods, techniques, and program flows that embody embodiments of the disclosure. However, it is understood that this disclosure may be practiced without these specific details. For instance, this disclosure refers to capacitors in pulse power drilling assemblies in illustrative examples. Embodiments of this disclosure can be also applied to downhole capacitors in other types of drilling operations. In other instances, well-known instruction instances, protocols, structures and techniques have not been shown in detail in order not to obfuscate the description.

Overview

As part of the electrical devices that may be utilized by a Pulsed Power Drilling Assembly (hereinafter "Assembly"), one or more sets or "banks" of electrical capacitors may be included the electrical circuitry included in the Assembly. For example, embodiments of the Assembly may include one or more banks of capacitors coupled to one or more primary winding(s) of an electrical power transformer and/or one or more banks of capacitors coupled to one or more secondary winding(s) of the electrical power transformer. The electrical power transformer may be used in various embodiments to step up voltages initially generated by an electrical generator, such as a turbine/alternator arrangement, which is included in the Assembly. The stepped-up voltages may include one or more different and/or higher voltages that may ultimately be applied to an electrode of the Apparatus for the purpose of drilling through a foundation material, and thus advance a borehole through the foundation material.

In various embodiments, the individual capacitors of a capacitor bank may be electrically coupled to one another in a series arrangement, a parallel arrangement, or some combination of serial and parallel arrangements of electrical couplings. The electrical coupling of the individual capacitors may be needed in order to meet the voltage level and/or current level requirements under which the capacitor banks are designed to operate as part of the Assembly. In addition, one or more electrical switching devices, such as solid-state switches, may be coupled to the one or more capacitor banks and configured to control switching into and out of the electrical circuits of the Assembly the one or more capacitor banks, including providing switching control over the individual capacitor banks and/or a set of capacitor banks in order to control the electrical power being generated and utilized by the Assembly.

During the process of electrical charging and discharging of the capacitors, and/or as a result of the environment where the Assembly and thus the capacitors are operating, heat may be generated by the capacitors, and/or transferred to the capacitors from the surrounding environment where the capacitors are located and/or are operating. As such, systems that allow for cooling to be provided to the capacitors and the capacitor banks may be needed in order to assure that the capacitors are not damaged or otherwise rendered less effective due to thermal stresses and elevated temperatures that the capacitors might otherwise experience without some form of cooling.

Embodiments described in this disclosure include arrangements of capacitors including cooling tubes positioned within and/or in close proximity to the capacitors, the cooling tubes arranged to provide one or more thermally conductive paths for heat generated by or generated in the vicinity of the capacitors to be removed. In various embodiments, the thermally conductive paths include a plurality of tubes formed from a conductive material, such as aluminum, which are placed in thermal contact with the individual capacitors. The cooling tubes may provide a flow path for a fluid, such as an oil, that flows or is pumped through the cooling tubes, for example from an oil reservoir by a pump, to absorb heat from the capacitors. In various embodiments, the cooling tubes are further arranged to provide the flow of the cooling fluid exiting the areas of the capacitors to a cooling device, such as a radiator. The cooling device such as the radiator may be in thermal contact with a fluid conduit, such as a center flow tube of the Assembly, which carries a fluid, such as drilling mud, configured to conduct heat transferred away from the cooling tubes and the fluid flowing through the cooling device, and thus away from the capacitors as a result of the flow of the drilling fluid through the center flow tube.

Pulse power drilling assemblies have greater power demands and greater heat generation than typical mechanical-based downhole drilling systems. In typical non-downhole applications, capacitors included in the systems are located at the surface where airflow surrounding the capacitors aids in cooling and heat dissipation. However, in a downhole environment, the capacitors utilized in the power delivery and control circuitry of the pulse power drilling assembly are still needed to meet the power demands, but the limited and enclosed spaces within the assemblies where these capacitors are located and need to operate does not allow for circulation and cooling using air. Downhole capacitors are typically much smaller than capacitors for non-downhole applications due to limitations associated with the size of the borehole and/or casing. The capacitors with cooling tubes disclosed herein provide an additional cooling mechanism to avoid overheating the capacitors of a pulsed power drilling assembly while achieving high power handling demands required of these capacitors and capacitor banks operating in the downhole environments where pulsed power drilling assemblies are utilized.

Example Illustrations

FIG. 1 illustrates a pulse power drilling system ("system") 100 including a pulse power drilling assembly ("assembly") 101, according to various embodiments. As illustrated in FIG. 1, assembly 101 is positioned within a borehole 102 extending into formation 109 and secured to a length of one or more sections of drill pipe 107 coupled to a drilling platform 103 and a derrick 104. In various embodiments, one or more logging tools 127 may be included as part of the sections of drill pipe 107. The assembly 101 is configured to further the advancement of the borehole 102 using pulsed electrical power generated by the assembly 101 and controllably emitted from electrode(s) 120 of the assembly in order to break up formation material 108 near the bottom of borehole 102.

A source of drilling fluid 106, which may be a "mud pit" located at surface 105 and in the vicinity of the borehole 102, is coupled to various fluid conduits configured to provide a flow of drilling fluid, indicated by an arrow 106A, which is provided thorough drilling fluid conduits to the drilling pipe(s) 107 supporting assembly 101 within the borehole 102. The flow of drilling fluid 106A is further coupled to provide a flow of drilling fluid through a turbine 110 positioned at the upper portion of assembly 101. The flow of drilling fluid through turbine 110 produces mechanical rotation of the turbine, which in turn is mechanically coupled to an alternator 111 of the assembly. The mechanical rotation of turbine 110 and alternator 111 provides the energy input used by assembly 101 to generate electrical power, wherein the generated electrical power is then further processed and controllably provided to the electrodes 120 in order to perform pulse power drilling operations, including the advancement of the borehole 102.

In addition to providing the energy to mechanically rotate turbine 110 and alternator 111, in various embodiments the flow of drilling fluid passing through the turbine 110 and the alternator 111 continues to flow through one or more sections of a center flow tube 125, which thereby provides a flow path for the drilling fluid through one or more sub-assemblies of the assembly 101 positioned between the turbine 110 and the electrodes 120. This flow of drilling fluid is indicated in FIG. 1 by the arrow 106B pointing downward through the cavity of the sections of center flow tube 125. Once arriving at the electrodes 120, the flow of drilling fluid may be expelled out from assembly 101 from one or more ports or nozzles located in or in proximity to the electrodes 120. After being expelled from the assembly 101, the drilling fluid flows back upward toward the surface 105 through the annulus created between a tool body 126 of the assembly 101 and the walls forming the sides of borehole 102, the flow illustratively represented by arrows 106C. This flow of drilling fluid back toward the surface may aid in the removal of the debris generated by the breaking up of the formation material at and nearby the electrodes 120. In addition, the flow of drilling fluid represented by arrow 106B passing through the center flow tube 125 or otherwise flowing through passageways in one or more of the sub-assemblies included within assembly 101 may provide cooling to one or more devices and/or one or more portions of the assembly 101.

In various embodiments of assembly 101, the center flow tube 125 may be located along a central longitudinal axis of the assembly and may have an overall outside diameter or outer shaped surface that is smaller in cross-section than the inside surface of the tool body 126 in cross-section. As such, one or more spaces are created between the center flow tube 125 and the inside wall of the tool body 126. These one or more spaces may be used to house various components, such as a rectifier controller 121, a voltage boost controller 122, and any other components, including electrical components included in the sub-assemblies of the assembly. These one or more spaces may also be used to accommodate electrical conductors, such as wires and electrical cables, that are used to transmit electrical power and/or control signals between various sub-assemblies of assembly 101. The center flow tube 125 is configured to seal the flow of drilling fluid within the hollow passageways included within the center flow tube, and at each joint (indicated by joints 124A-H, 123B-C), coupling sections of the center flow tube 125 together, in order to prevent the drilling fluid from leaking into or otherwise gaining access to these spaces between the center flow tube 125 and the inside wall of the tool body 126. Leakage of the drilling fluid outside the center flow tube 125 and within the assembly 101 may cause damage to the electrical components and/or other devices located in these spaces and/or may contaminate fluids, such as lubrication oils, contained within these spaces, which may impair or completely impede the operation of the assembly 101 with respect to drilling operations.

As illustrated in FIG. 1, assembly 101 includes multiple sub-assemblies, including in some embodiments a turbine 110 and an alternator 111 positioned at the top of the assembly as described above. The turbine/alternator combination is configured to be coupled to multiple additional sub-assemblies. These additional sub-assemblies may include various combinations that may include a rectifier 112, a DC-link 113, a voltage booster 114, a pulse power controller 115, switches or switching banks (switches) 116, primary capacitors 117, a transformer 118, secondary capacitors 119, and one or more electrode(s) 120. These non-limiting examples of types of sub-assemblies may not be specifically labeled in FIG. 1 but are indicated as a stack of blocks included in the assembly 101 and extending between the turbine/alternator (110/111) and the electrode(s) 120 in the figure.

In various embodiments of assembly 101 the rectifier 112, DC-link 113, and voltage booster 114 may be referred to a "power conditioning system", or PCS. These additional sub-assemblies of the PCS may be electrically coupled to receive the electrical power output generated by the operation of alternator 111, and to provide further processing of the received electrical power in order to provide a conditioned electrical power output comprising conditioned electrical power. This further processing of the electrical power output received at the PCS may include rectification, voltage boosting, and frequency and/or waveform smoothing of the received electrical power. Additional functions that embodiments of the PCS may be configured to perform may include dynamic braking and inductive output filtering. The conditioned electrical power output provided by the PCS may be coupled, for example through field joint 123B, to additional sub-assemblies of assembly 101, which may further process the conditioned electrical power, and controllably provide the further processed electrical power to the electrode(s) 120 in order to perform various pulse power drilling operations. In various embodiments, assembly 101 includes a rectifier controller 121 configured to control the rectification functions being performed by the PCS. In various embodiments, assembly 101 includes a voltage boost controller 122 configured to control the voltage boosting functions being performed by the PCS.

As described above, various embodiments of assembly 101 include some combination of additional sub-assemblies that may include switches 116, primary capacitors 117, transformer 118, and secondary capacitors 119. The combination of these sub-assemblies in various embodiments may be referred to as the "pulse power sub-assembly" or "pulse power unit". The pulse power sub-assembly may be configured to receive the conditioned electrical power output from the PCS. The primary capacitors 117 of the pulse power sub-assembly may be configured to store this received electrical power, and wherein switches 116 may be configured to control the charging and/or discharging of the primary capacitors. Switches 116 may also be configured to controllably couple electrical power stored in the primary capacitors 117 to the primary winding(s) of transformer 118, wherein transform 118 is configured to provide a boosted voltage output at the secondary winding(s) of the transformer. The boosted electrical power may be controllably stored (in various embodiments by operation of switches 116), by charging secondary capacitors 119. The electrical energy stored at secondary capacitors 119 may be controllably applied to electrode(s) 120, for example under the control of pulse power controller 115 and using switches 116, in order to perform various pulse power drilling operations. Temperature sensors 130 and 131 may be attached or in the proximity of the primary capacitors 117 and secondary capacitors 119, respectively, to monitor temperature of the capacitors and/or fluids flowing through the capacitors during operation of the pulse power sub-assembly.

As shown in FIG. 1, the individual sub-assemblies of assembly 101 may to coupled together using a set of joints (123B-C, 124A-H), wherein each of the joints is configured to couple together one or more adjacent sub-assemblies in a desired arrangement to form at least a section of assembly 101. An additional joint 123A is used to couple the assembly 101 to the sections of drill pipe 107. Joint 123A, which may be referred to as a "field joint," may be used to allow positioning of assembly 101 within the borehole 102, and to facilitate the coupling of the flow of drilling fluid 106A provided through the sections of drilling pipe 107 to the sub-assemblies of assembly 101, including the turbine 110. Embodiments of the assembly 101 may include one or more additional field joints (e.g., joints 123B, 123C), coupling various sub-assemblies of assembly 101 together. Field joints may be utilized in places where the assembly 101 could or needs to be assembled or disassembled in the field, for example at the drill site. In addition, assembly 101 may utilize one or more joints, referred to as "shop joints", for example each of joints 124A-H in FIG. 1. These shop joints may be configured to allow various sub-assemblies of assembly 101 to be coupled together, but for example at an assembly plant or at a factory, as opposed to being assembled/disassembled in the field. The need for these shop joints may be a result of having various sub-assemblies of the assembly 101 being provided by different manufacturers, or assembled at different assembly locations, which then require assembly before being shipped out to the field or to the drill site.

Regardless of whether a joint in the assembly 101 is referred to as a field joint or a shop joint, a mechanism is provided at the joint to couple together the center flow tube 125 extending through any of the sub-assembles that include the center flow tube 125 and/or require passageways to allow for the flow of drilling fluid through the sub-assembly. This may include forming a joint between separate sections of the center flow tube 125. This may also include using a hydraulic seal capable of sealing the flow of the drilling fluid within the center flow tube 125 without allowing leaks at the joints 123B-C and 124A-H. In addition to providing a coupling of drilling fluid between sub-assemblies, one or more of the joints as described above may be configured to provide a mechanism to couple electrical power and/or electrical control signal across the joint and between adjoining sub-assemblies of the assembly 101.

In various embodiments, positioning of the assembly 101 within the borehole, for example the longitudinal positioning of the assembly within borehole, may be controlled by the derrick 104 and by controlling the number and the positioning of the sections of drill pipe 107. In various embodiments it is not necessary for the assembly 101 to be rotated as part of the pulse power drilling process, but some degree of rotation and/or oscillations of the assembly 101 may be provided in various embodiments of drilling processes utilizing the assembly 101.

As described above, one or more of the sub-assemblies included in the assembly 101 may comprise one or more sets or "banks" of capacitors, for example as part of the primary capacitors 117 or secondary capacitors 119 as shown in FIG. 1. In order to provide cooling to these sets or "banks" of capacitors, the individual capacitors may be physically positioned in thermal contact with one or more cooling tubes (not shown in FIG. 1). The cooling tubes may be formed from a thermally conductive material, such as aluminum, and may be configured to provide a flow of a cooling fluid, such as oil, through the cooling tubes. The flow of the cooling fluid through the cooling tubes is arranged to conduct heat generated by the capacitors and/or in the vicinity of the capacitors away from the capacitors to a cooling device, such as a radiator (not shown in FIG. 1). The cooling device may be in thermal contact with the flow of drilling fluid, such as drilling mud, wherein the cooling device (e.g., the radiator) is arranged to transfer heat from the cooling fluid to the flow of drilling fluid, thus transferring the heat generated by or in the vicinity of the capacitors to the drilling fluid and away from the capacitors. These and other aspects and features of the capacitors are further described below with respect to FIGS. 2-4E.

Figure 2:
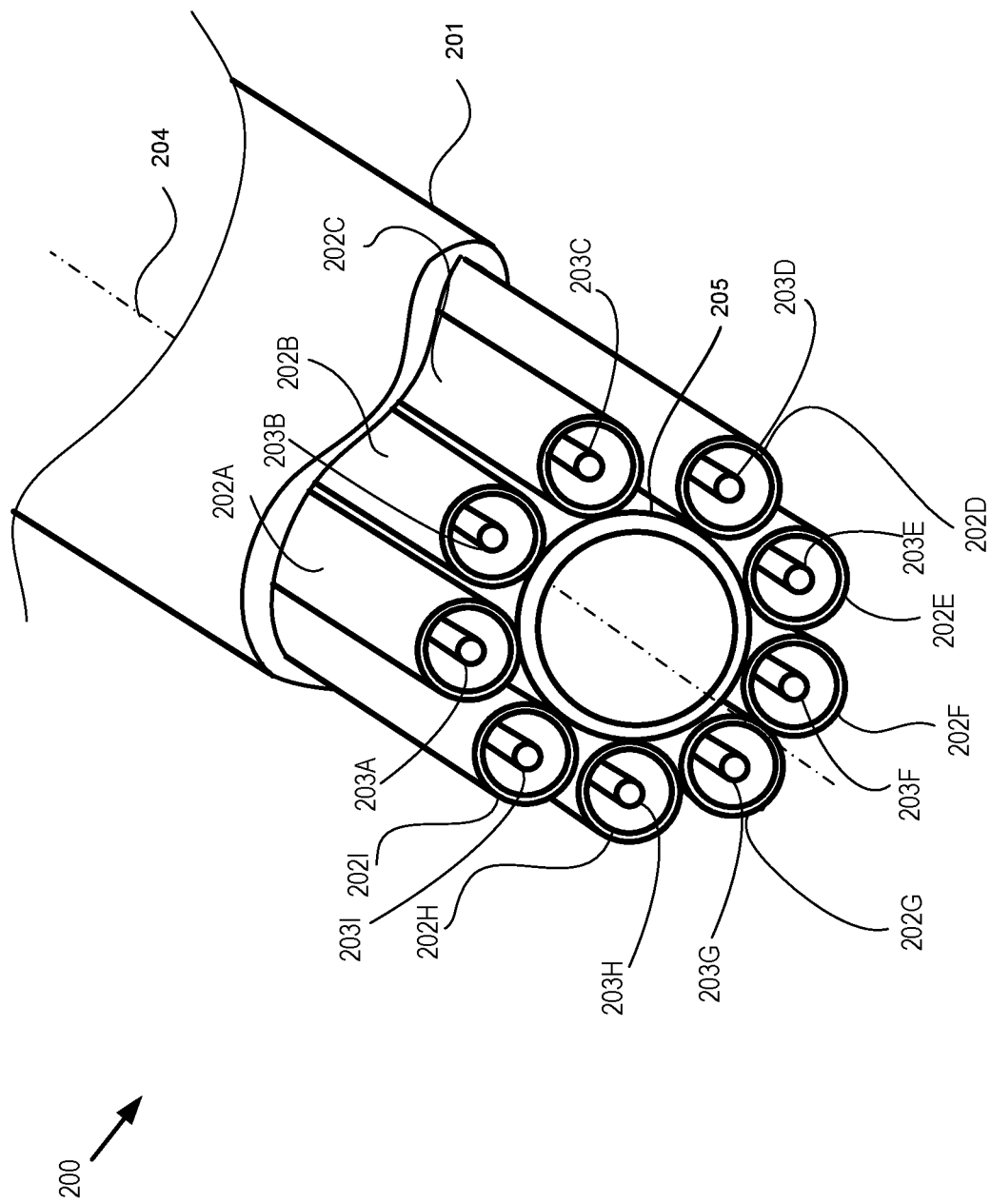
FIG. 2 illustrates a cut-away perspective view of one embodiment of capacitive cooling tubes that may be utilized in a capacitor bank included in a pulse power drilling assembly, according to various embodiments.

FIG. 2 illustrates a cut-away perspective view of one embodiment of capacitive cooling tubes 203A-I that may be utilized in a capacitors 202A-I included in an assembly, according to various embodiments. FIG. 2 illustrates a system 200 including a portion of a tool body 201 surrounding an outer surface of a portion of an assembly, such as the assembly 101 of FIG. 1, that is cut away to show a portion of a plurality of capacitors 202A-I. The capacitors 202A-I may be individual capacitors, each capacitor 202A-I may include multiple capacitors forming capacitor banks, or there may be a combination of individual capacitors and capacitor banks. Capacitors 202A-I may be primary capacitors, such as capacitors 117 (FIG. 1), or they may be secondary capacitors, such as capacitors 119 (FIG. 1). The capacitors 202A-I are illustrated in FIG. 2 by the plurality of cylindrical shapes extending parallel to a longitudinal axis 204 of the assembly. Each "cylinder" may include a single large capacitor or may include a bank of capacitors each arranged along the longitudinal axis 204 of the assembly. Each capacitor may include layers of material separated by a dielectric. The layers may spiral outward from the center of the capacitor or the layers may form disks along the length of the capacitor. The plurality of individual capacitors or capacitor banks may further be arranged in a radial arrangement surrounding a center flow tube 205 extending along and centered around the longitudinal axis 204 of the assembly. Center flow tube 205 may be the center flow tube 125 as illustrated and described above with respect to FIG. 1. Referring again to FIG. 2, in various embodiments center flow tube 205 provides a passageway that extends through the center flow tube 205 and is configured to be coupled to other fluid flow passageways provided in sub-sections the assembly that are physically jointed to the assembly illustrated in FIG. 2 to provide a pathway for a flow of fluid, such as drilling fluid or drilling mud, through the assembly.

As shown in FIG. 2, each of the capacitors 202A-I have a corresponding cooling tube 203A-I. The cooling tubes 203A-I are embedded cooling tubes extending through the respective capacitors 202A-I. The cooling tubes 203A-I may be formed of a thermally conductive material, such as a metal, such as aluminum. Each of the cooling tubes 203A-I may at least partially enclose a respective interior space that is configured to provide a passageway for a flow of a cooling fluid, such as an oil, through the cooling tube 203A-I. In various embodiments, the cooling fluid may be provided from a reservoir and pressurized by a pump to cause the cooling fluid to flow into each of the cooling tubes 203A-I.

In other embodiments, gravity may cause the flow of cooling fluid through the cooling tubes 203A-I. As the cooling fluid flows through the cooling tubes 203A-I, heat generated by the respective capacitors 202A-I is transferred through the cooling tubes 203A-I and to the cooling fluid. The cooling fluid then continues to flow out of the capacitors 202A-I and to a cooling device (not pictured), such as a radiator. The cooling fluid can then be cooled before being re-circulated back through the cooling tubes 203A-I.

The positioning of the cooling tubes 203A-I embedded within the capacitors 202A-I, in conjunction with the flow of cooling fluid through the cooling tubes 203A-I, provides a mechanism to transfer heat away from the capacitors 202A-I. This helps prevent an overheating condition of the capacitors from occurring. Additional cooling of the capacitors 202A-I and/or capacitor banks may occur due to heat transferred directly from the capacitors 202A-I to the center flow tube 205 due to the contact and/or proximity of at least some portion of the capacitors 202A-I to the center flow tube 205.

The number, arrangement, shape, and overall configuration of the capacitors 202A-I and the cooling tubes 203A-I as shown in FIG. 2 is intended to be an illustrative and non-limiting example. Other arrangements and shapes of the cooling tubes, and the relative arrangements of the cooling tubes relative to the capacitors and/or the capacitor banks and/or relative to one another, are contemplated for use in the cooling of the capacitors included in various embodiments of the assembly. For example, as illustrated in FIG. 2 cooling tubes 203A-I include a cylindrical shape encircling a hollow fluid passageway, where both the cooling tube and the hollow fluid passageway have a circular shape in cross-section. However, either or both the cooling tubes and/or the hollow fluid passageways may have other shapes in cross-section, such as but not limited to a square, rectangular, elliptical, triangular, oval shape or any other enclosed shape. In various embodiments, the shape of the cooling tube in cross section may be different from the shape of the hollow passageway in cross-section that is encircled by the cooling tube. In addition, as illustrated in FIG. 2 the longitudinal axis of the cooling tubes 203A-I extends along a straight line that is parallel to longitudinal axis 204 of the portion of the assembly. However, in various embodiments the longitudinal axis of one or more of cooling tubes 203A-I may extend along a non-linear path, such as a curved, serpentine, or spiral path.

Figure 3:
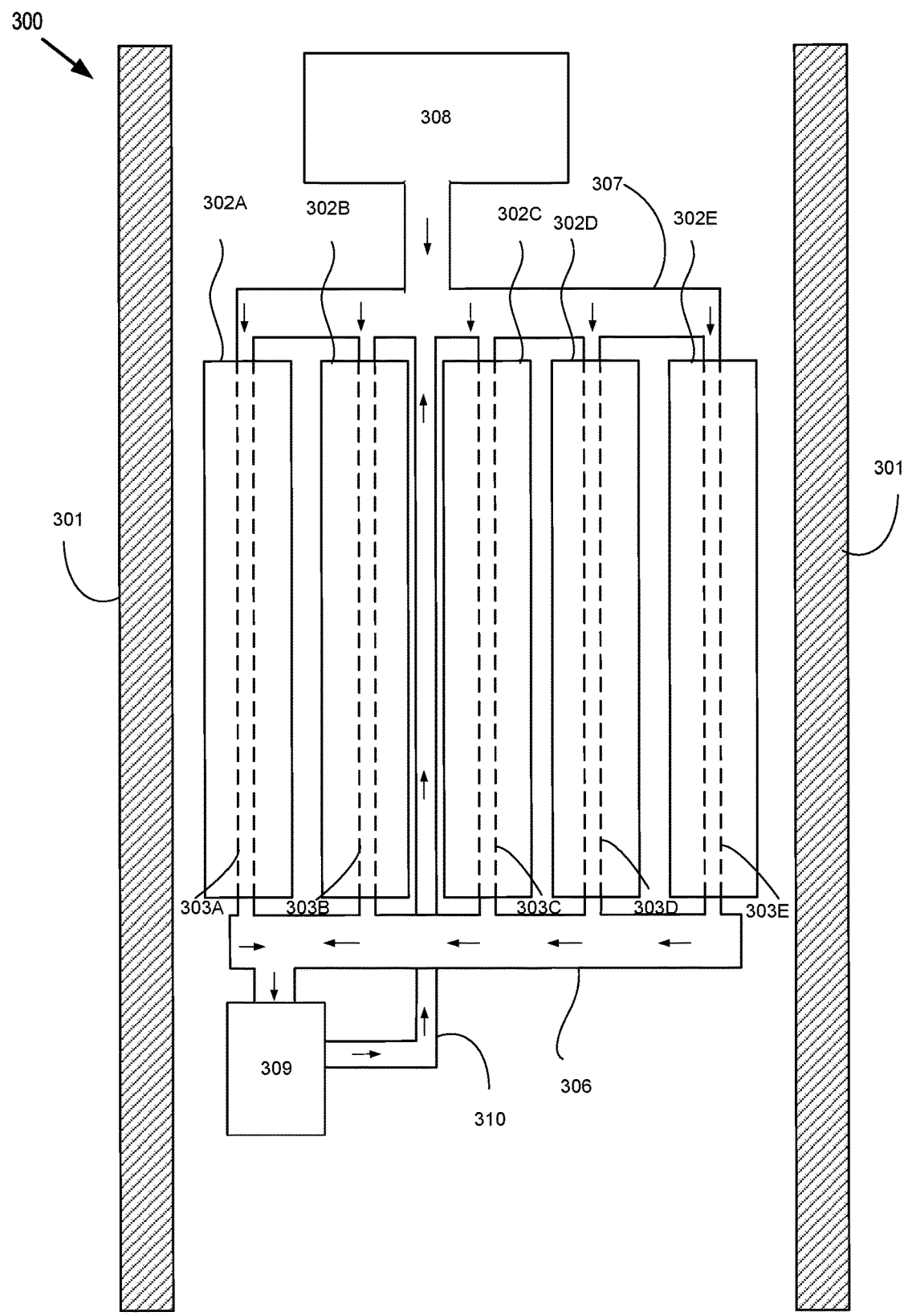
FIG. 3 is a block diagram illustrating a capacitor cooling system that may be utilized in a sub-section of a pulse power drilling assembly that includes capacitors and/or capacitor banks, according to various embodiments.

FIG. 3 is a block diagram illustrating a capacitor cooling system 300 that may be utilized in a sub-section of a pulse power drilling assembly that includes capacitors and/or capacitor banks 302A-E, according to various embodiments. Embodiments of the capacitor cooling system 300 may include one or more capacitor cooling systems, such as but not limited to the system 200 of FIG. 2 and/or of the systems 400A-E as illustrated and described with respect to FIGS. 4A-4E below. FIG. 3 illustrates a set of capacitors or capacitor banks (hereinafter "capacitors") 303A-E positioned between a section of a tool body 301 of an assembly, such as the assembly 101 as illustrated and described above with respect to FIG. 1. Referring again to FIG. 3, the capacitor(s) or capacitor banks 302A-E may extend along a portion of longitudinal axis of the assembly that extends parallel to and is enclosed within the tool body 301. As shown in FIG. 3, each of the capacitors 302A-E includes a respective cooling tube 303A-E embedded within and extending through the respective capacitors where the cooling tube is located. Each of the cooling tubes 303A-E includes a passageway that is in fluid communication with an input manifold 307 at one end and with a radiator 306 at the opposite end. Each of the cooling tubes 303A-E provides a fluid passageway for a flow of cooling fluid provided at the input manifold 307, which flows through the respective cooling tube, and exits the cooling tube into the radiator 306.

In various embodiments, the cooling fluid is supplied from a cooling fluid reservoir 308, in various embodiments under a pressure, which causes the cooling fluid to flow through the cooling tubes 303A-E. In various embodiments, gravity moves the cooling fluid from the cooling fluid reservoir 308 through the cooling tubes 303A-E. Because of the vertical alignment within the tool body 301 with the cooling fluid reservoir uphole of the capacitors 302A-E and cooling tubes 303A-E, gravity naturally pulls the fluids in the reservoir 308 through the cooling tubes 303A-E. The cooling fluid reservoir 308 may include a drilling fluid flowing through the flow tube in the tool body 301 or the cooling fluid reservoir 308 may contain a dedicated cooling fluid that is separate from any other fluid in the tool. The cooling fluid reservoir 308 may also include a pressure compensation fluid that fills the tool body 301. While FIG. 3 depicts the cooling fluid reservoir 308 as being contained within the tool body 301, the cooling fluid reservoir 308 may alternatively be outside of the tool body 301 in an annulus between the tool body 301 and a formation.

While passing through the cooling tubes 303A-E, heat is transferred from the capacitors 302A-E to the cooling fluid through the cooling tubes 303A-E. The transferred heat is then carried out through the cooling tubes 303A-E with the cooling fluid and into the input manifold 307. In various embodiments, a pump 309 may be in fluid communication with the radiator 306 to recirculate the cooling fluid back to the input manifold 307 via a return line 310. The radiator 306 is arranged to be in thermal contact with a thermal mass, such as tool body 301, and/or another cooling fluid, such as the drilling fluid flowing through the center flow tube (not shown in FIG. 3 for clarity's sake), which transfers heat away from the cooling fluid flowing through the radiator 306, and thus away from the capacitors 302A-E. The recirculated cooling fluid that has been cooled by passing through the radiator 306 then becomes available to again flow through the cooling tubes 303A-E, thereby providing additional cooling of the capacitors 302A-E.

In some embodiments, convection and the pull of gravity allowing the fluid to flow down through the cooling tubes 303A-E may not sufficiently dissipate enough heat to cool the capacitors 302A-E. In such situations, multiple sets of radiators and capacitors may be stacked to provide additional cooling locations for the cooling fluid. For example, the input manifold 307 may be replaced with a second radiator, similar to radiator 306. An additional set of capacitors, similar to capacitors 302A-E may be included below the second radiator. This stack may be continued for multiple sets for radiators and capacitors until a set length is achieved. Alternatively, the length of the capacitors 302A-E may be reduced to shorten the heat dissipation time to the cooling fluid, preventing the fluid was reaching undesirable temperatures.

In some embodiments, an additional pump may be added at or near reservoir 308 or radiator 306 to provide additional force to push the cooling fluids through the cooling tubes 203A-E. This would allow for control of the velocity of cooling fluids. Increasing the velocity of the fluids decreases the temperature gain of the cooling fluids, allowing for greater lengths of capacitors to be cooled.

Figure 4A:
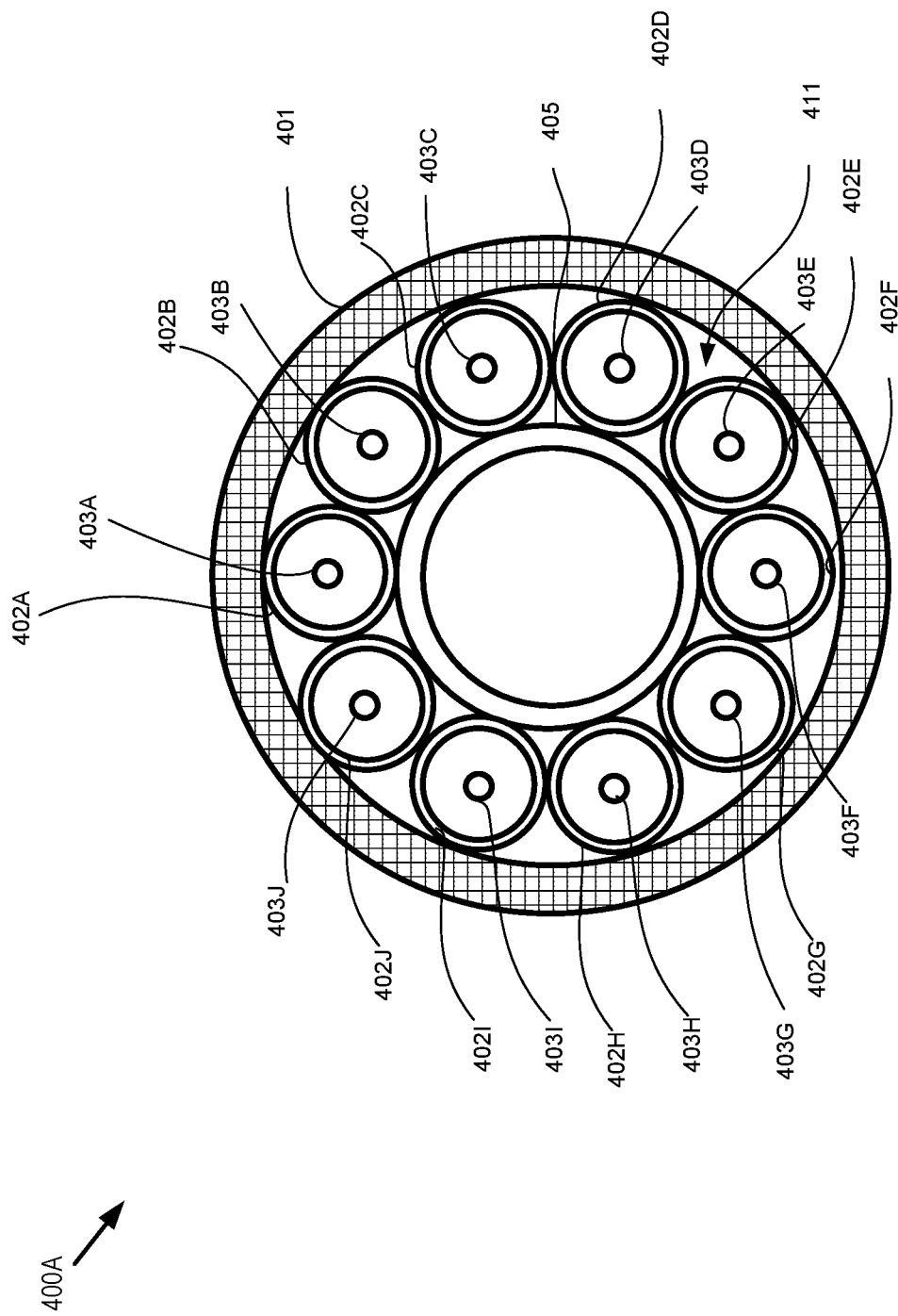
FIG. 4A illustrates a portion of a pulse power drilling assembly shown in cross section relative to a longitudinal axis of the assembly that includes a center flow tube and a plurality of cooling tubes embedded within a plurality of capacitors, according to various embodiments.

FIG. 4A illustrates a portion of a pulse power drilling assembly shown in cross section relative to a longitudinal axis of the assembly that includes a center flow tube 405 and a plurality of cooling tubes 403A-J embedded within a plurality of capacitors 402A-J, according to various embodiments. FIG. 4A depicts a capacitor cooling system 400A. For example, the system 400A of FIG. 4A may be substantially similar to the system 200 of FIG. 2, and/or may be arranged in a system that includes additional fluid conduits, manifolds, reservoirs, and/or pump(s) as illustrated and described above with respect to FIG. 3. As shown in FIG. 4A, capacitors 402A-J are arranged in a radial arrangement around and surrounding the outer surface of a center flow tube 405 within a tool body 401. Each of the capacitors 402A-J includes a cooling tube 403A-J embedded with the respective capacitor. Each of the cool tubes may be coupled to an input manifold (not shown) at one end of the cooling tube and to a cooling device, such as a radiator, at the opposite end of the cooling tube in order to provide a flow of cooling fluid through each of the cooling tubes. With reference to FIG. 3, the input manifold may be substantially similar to the input manifold 307 and the radiator may be substantially similar to the radiator 306 of FIG. 3. Referring again to FIG. 4A, the flow of the cooling fluid through the cooling tubes 403A-J provides a mechanism to transfer heat generated by the capacitors 402A-J to the cooling fluid through the cooling tubes. the cooling fluid is then transported away from the capacitors 402A-J with the flow of the cooling fluid exiting the cooling tubes 403A-J.

The contact between capacitors 402A-J and the center flow tube 405 may provide additional thermal flow paths for heat generated by the capacitors to flow to the center flow tube and be carried away from the capacitors. In addition, an external space 411 surrounding the capacitors 402A-J may be filled with a material, such as a fluid, that further aids in the transfer of heat generated by capacitors to the center flow tube 405 through the material provide in the exterior space 411. In various embodiments, a portion of the outer surface of each of capacitors 402A-J is in contact with a portion of the adjacent set of capacitors along a contact area extending in a longitudinal direction. In addition or in the alternative, a portion of the outer surface of each of the capacitors 402A-J is in contact with an inner surface of tool body 401 and/or an outer surface of center flow tube 405. These additional contacts, when present, may aid in the dissipation of heat generated by the capacitors 402A-J. Further, although illustrated as having a circular shape in cross-section in FIG. 4A, embodiments of system 400A may include capacitors and/or cooling tubes having some other shape in cross-section besides a circular shape, such as any of the shapes and variations and/or combinations of shapes described above with respect to capacitors 202A-I and cooling tubes 203A-I and FIG. 2.

Figure 4B:
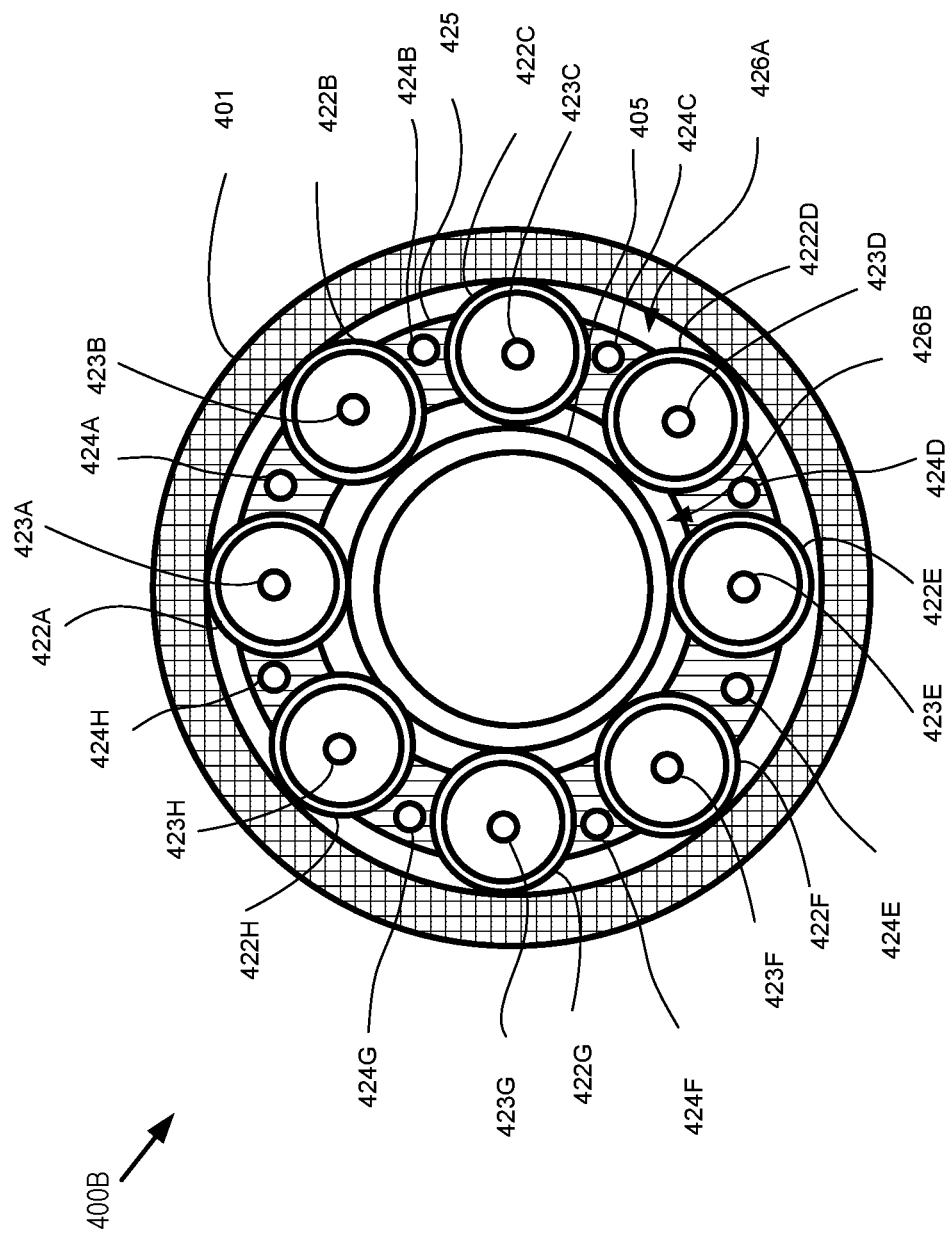
FIG. 4B illustrates a portion of a pulse power drilling assembly shown in cross section relative to a longitudinal axis of the assembly that includes a center flow tube, a plurality of cooling tubes embedded within a plurality of capacitors, and a positioner spaced a distance from the center flow tube, according to various embodiments.

FIG. 4B illustrates a portion of a pulse power drilling assembly shown in cross section relative to a longitudinal axis of the assembly that includes a center flow tube 405, a plurality of cooling tubes 423A-H embedded within a plurality of capacitors 422A-H, and a positioner 425 spaced a distance from the center flow tube 405, according to various embodiments. System 400B may be arranged in a system that includes additional fluid conduits, manifolds, reservoirs, and/or pump(s) in a same or similar manner as illustrated and described above with respect to FIG. 3. As shown in FIG. 4B, capacitors 422A-H are arranged in a radial arrangement around and surrounding the outer surface of a center flow tube 405. Each of the capacitors 422A-H includes a cooling tube 423A-H embedded in the respective capacitor 423A-H. In contrast to the arrangement of FIG. 4A, the capacitors 422A-H of system 400B in FIG. 4B are arranged so that each capacitor is separated by some space and distance relative to each other and are not in direct physical contact with one another, including any adjacent capacitor.

In various embodiments, a positioner 425 is provided that is in physical contact with each of the capacitors 422A-H. In various embodiments positioner 425 is configured to maintain the relative physical positioning between the capacitors 422A-H relative to one another. In various embodiments, the positioner 425 may not be in contact with either the outer surface of the center flow tube 405 and/or the inner wall of the tool body 401. In alternative embodiments, the positioner 425 may be in contact with either the outer surface of the center flow tube 405 and/or in contact with the inner wall of the tool body 401.

In various embodiments, the positioner 425 includes a plurality of cooling tubes 424A-H embedded within the positioner 425 and extending through the positioner 425 so that a first end of each of the cooling tubes 424A-H extends from the positioner and is in fluid communication with an input manifold, such as input manifold 307 of FIG. 3, providing a flow of cooling fluid to the cooling tubes, and where the opposite ends of each of the cooling tubes 424A-H extend from positioner 425 and are in fluid communication with the cooling device, such as radiator 306 of FIG. 3, configured to remove heat from the cooling fluid as it exits the cooling tubes 413A-H.

In various embodiments, the positioner 425 is made of a thermally conductive material, such as a metal, such as aluminum. In alternative embodiments, the positioner 425 is made of a thermally insulative material, such as ceramic. In various embodiments, external spaces 426A-B surrounding the capacitors 422A-H and the positioner 425 may be filled with a fluid or other material that aids in the transfer of heat from the capacitors 422A-H to the center flow tube 405. In various embodiments, a portion of the outer surface of each of the capacitors 422A-H is in contact with an inner surface of tool body 401 and/or an outer surface of center flow tube 405. These additional contacts, when present, may aid in the dissipation of heat generated by the capacitors 422A-H. Further, although illustrated as having a circular shape in cross-section in FIG. 4B, embodiments of system 400B may include capacitors and/or cooling tubes, including cooling tubes embedded within capacitors 422A-H and/or cooling tubes embedded within positioner 425, which have some other shape in cross-section besides a circular shape, such as any of the shapes and variations and/or combinations of shapes described above with respect to capacitors 202A-I and cooling tubes 203A-I and FIG. 2.

Figure 4C:
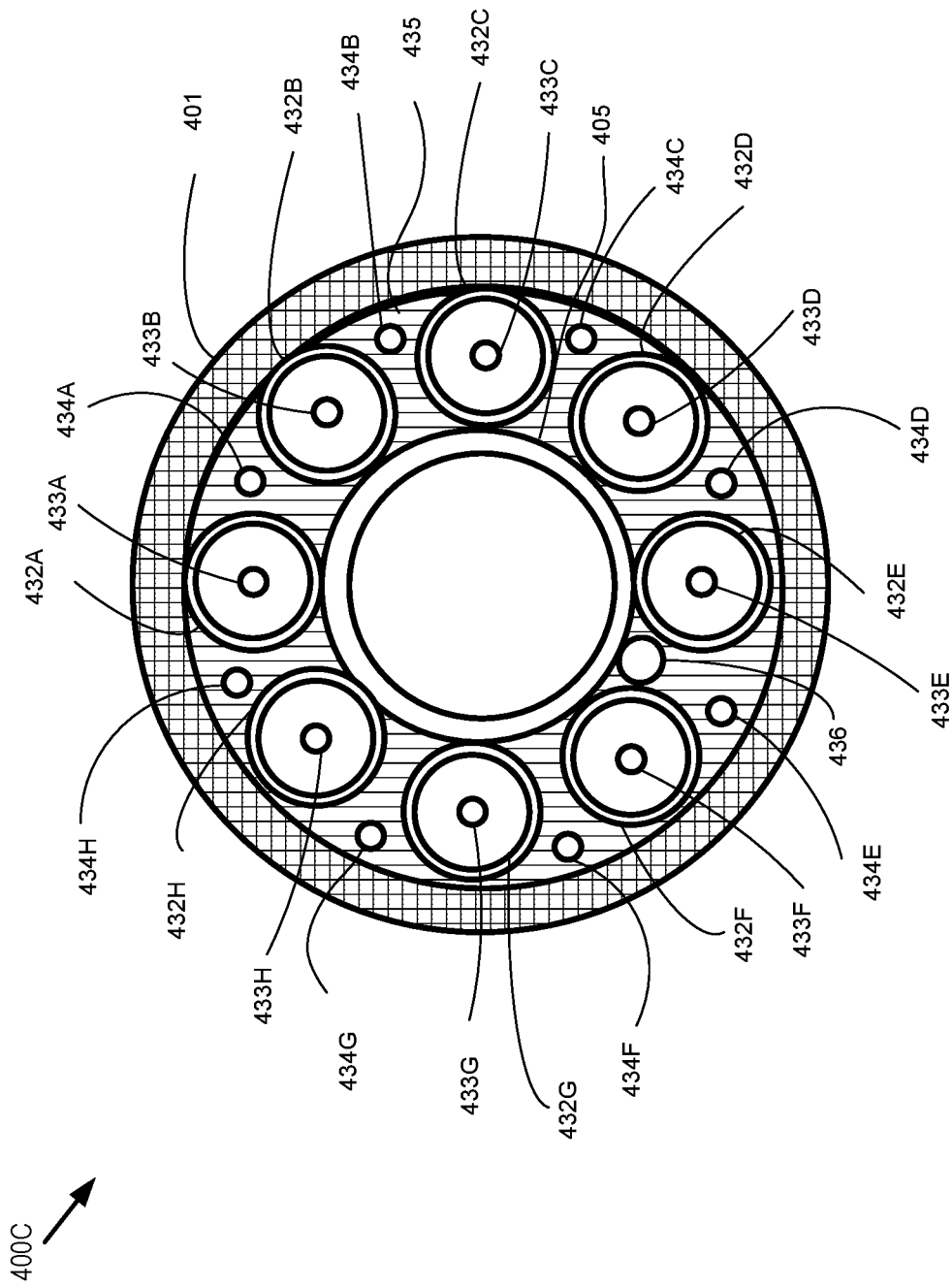
FIG. 4C illustrates a portion of a pulse power drilling assembly shown in cross section relative to a longitudinal axis of the assembly that includes a center flow tube, a plurality of cooling tubes embedded within a plurality of capacitors, and a positioner in contact with the center flow tube, according to various embodiments.

FIG. 4C illustrates a portion of a pulse power drilling assembly shown in cross section relative to a longitudinal axis of the assembly that includes a center flow tube 405, a plurality of cooling tubes 433A-H embedded within a plurality of capacitors 432A-H, and a positioner 435 in contact with the center flow tube, according to various embodiments. FIG. 4C depicts a capacitor cooling system 400C. System 400C may be arranged in a system that includes additional fluid conduits, manifolds, reservoirs, and/or pump(s) in a same or similar manner as illustrated and described above with respect to FIG. 3. As shown in FIG. 4C, a positioner 435 is configured to fill the spaces between individual capacitors 432A-H, an outer surface of a center flow tube 405, and an inner wall of a tool body 401. Each of the capacitors 432A-H includes a cooling tube 433A-H embedded within the respective capacitor 432A-H. In addition, the capacitors may be arranged so that each of the capacitors 432A-H is separated by some space and distance relative to each other and are not in direct physical contact with one another, including any adjacent capacitor.

In various embodiments of system 400C, positioner 435 includes a plurality of cooling tubes 434A-H embedded within the positioner and extending through the positioner so that a first end of each of the cooling tubes 434A-H extending through the positioner 435 is in fluid communication with an input manifold, such as the input manifold 307 of FIG. 3, providing a flow of cooling fluid, and the opposite end of each of the cooling tubes 434A-H embedded within the positioner 435 is in fluid communication with the cooling device, such as radiator 306 of FIG. 3, configured to remove heat from the flow of cooling fluid flowing through the cooling tubes as the cooling fluid exits the cooling tubes 433A-H and enters the cooling device (e.g., the radiator). The cooling fluid that has been cooled by passing through the radiator is recirculated through a return line 436 to a cooling fluid reservoir, such as reservoir 308 of FIG. 3. The recirculation of fluids through the return line 436 provides an additional cooling mechanism for the system 400C. In various embodiments, a portion of the outer surface of each of the capacitors 432A-H is in contact with an inner surface of tool body 401 and/or an outer surface of center flow tube 405. These additional contacts, when present, may aid in the dissipation of heat generated by the capacitors 432A-H. Further, although illustrated as having a circular shape in cross-section in FIG. 4C, embodiments of system 400C may include capacitors and/or cooling tubes, including cooling tubes embedded within capacitors 432A-H and/or cooling tubes embedded within positioned 435, which have some other shape in cross-section besides a circular shape, such as any of the shapes and variations and/or combinations of shapes described above with respect to capacitors 202A-I and cooling tubes 203A-I and FIG. 2.

The positioners 425 and 435 of FIGS. 4B and 4C, respectively, provide additional material to absorb the heat generated by the capacitors while also maintaining distance between the capacitors in the respective system in order to prevent potential heat transfer between capacitors. However, the positioner does occupy additional space that results in lower density of capacitors and space available for capacitors within the tool body. As such, the size of the positioner can be adjusted to best fit the energy needs of the system.

Figure 4D:
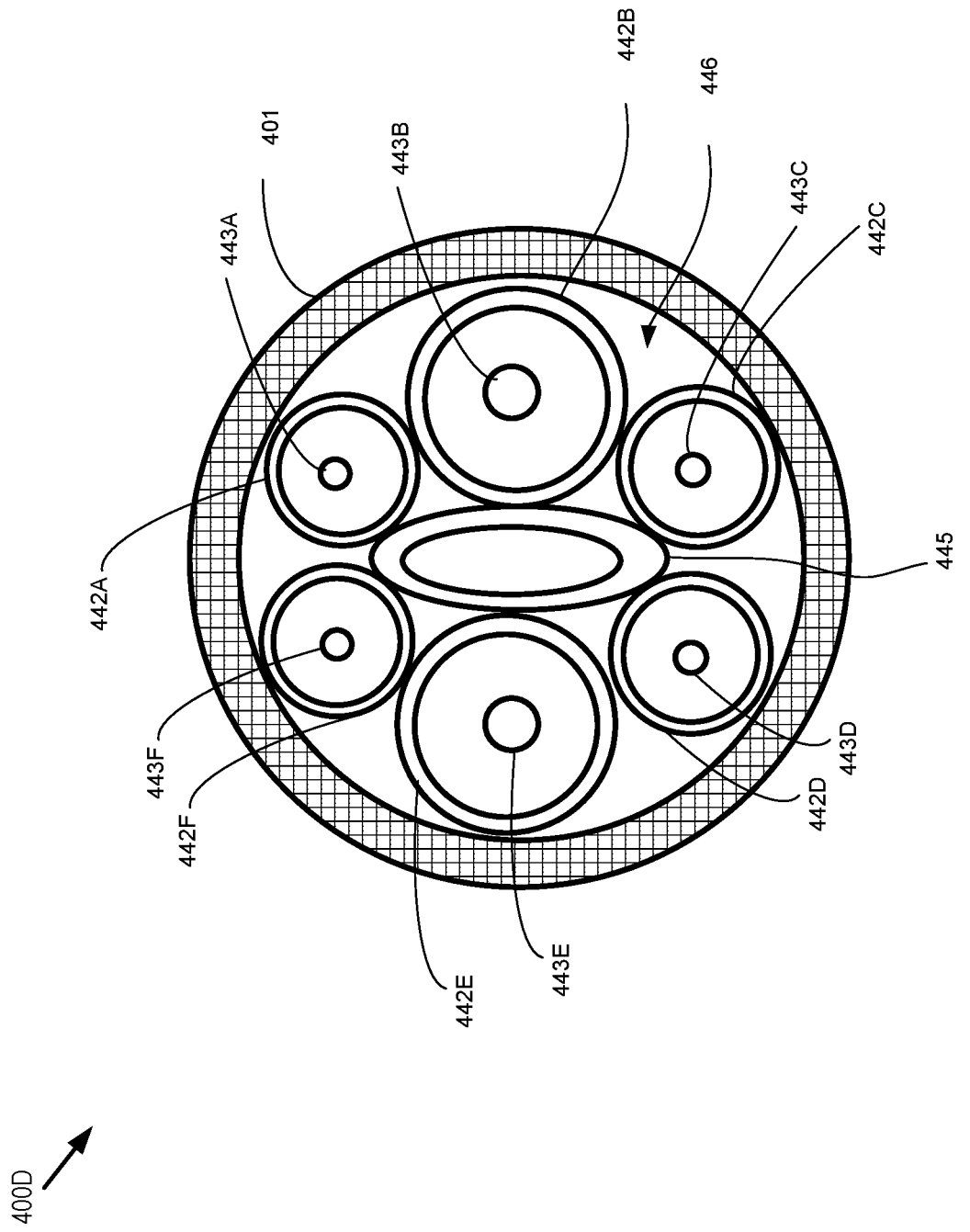
FIG. 4D illustrates a portion of a pulse power drilling assembly shown in cross section relative to a longitudinal axis of the assembly that includes an elliptical center flow tube and a plurality of cooling tubes embedded within a plurality of capacitors, according to various embodiments.

FIG. 4D illustrates a portion of a pulse power drilling assembly shown in cross section relative to a longitudinal axis of the assembly that includes an elliptical center flow tube 445 and a plurality of cooling tubes 443A-F embedded within a plurality of capacitors 442A-F, according to various embodiments. FIG. 4D depicts a capacitor cooling system 400D. System 400D may be arranged in a system that includes additional fluid conduits, manifolds, reservoirs, and/or pump(s) in a same or similar manner as illustrated and described above with respect to FIG. 3. FIG. 4D depicts a system 400D with capacitors 442A-F arranged radially around a center flow tube 445 inside a tool body 401. Unlike embodiments of the previous systems as illustrated above, the flow tube 445 of FIG. 4D may be non-circular in cross-section. A non-circular flow tube, such as the elliptical flow tube 445 as illustrated in FIG. 4D allows for different configurations of capacitors. Embodiments of systems for cooling capacitors may benefit from capacitors that vary in size, for example area and/or shape in cross-section. For example, system 400D as illustrated in FIG. 4D depicts six total capacitors 442A-F, each including a respective cooling tube 443A-F. Two of the capacitors, capacitors 442B and 442E, are larger in cross-sectional diameter compared to the cross-sectional diameter of capacitors 442A, 442C, 442D, and 442F. Different size capacitors may allow for variations between the voltage ratings, aging, temperature stability, and/or cost of the capacitors in the capacitor system that may be included in the capacitors included in a pulse power drilling assembly that includes a capacitor cooling system. By varying the size of the capacitors, capacitor cooling systems such as system 400D may be better able to handle diverse conditions existing in downhole drilling environments where the assembly including the capacitors may be configured to operate.

To account for the larger capacitors 442B and 442E, the shape of the center flow tube 445 may be selected during design of the system to best accommodate an optimal capacitor configuration. For example, in the configurations depicted in FIG. 4D, an elliptical shape allows room for the larger capacitors on either side of the flow tube 445. Other shapes of flow tubes may be used depending on the configuration and arrangement of the capacitors and the size of the tool body. In various embodiments, one or more spaces 446 exist in areas between the various capacitors 442A-F and may extend to spaces adjacent to portion of the outside surface of the center flow tube 445 and/or to spaces adjacent to portions of the inside surface of the tool body 401. In various embodiments, spaces 446 include a fluid, such as an oil, configured to aid in thermally coupling capacitors 442A-F to the center flow tube and/or the tool body in order to aid in conducting heat away from the capacitors.

Additionally, the size of the cooling tubes 443A-F may be adjusted based on the size of the capacitors 442A-F. For example, cooling tubes 443B and 443E may have a larger diameter than cooling tubes 443A, 443C-D, and 443F. The larger diameter cooling tube may allow for proportionate cooling of the larger capacitor by allowing more fluid to flow through the cooling tube. In various embodiments, one or more of capacitors 442A-F are in contact with at least one other capacitor that is adjacent to one another. In various embodiments, a portion of the outer surface of each of the capacitors 442A-F is in contact with an inner surface of tool body 401 and/or an outer surface of center flow tube 445. These additional contacts, when present, may aid in the dissipation of heat generated by the capacitors 442A-H. Further, although illustrated as having a circular shape in cross-section in FIG. 4D, embodiments of system 400D may include capacitors and/or cooling tubes, including cooling tubes embedded within capacitors 442A-F, which have some other shape in cross-section besides a circular shape, such as any of the shapes and variations and/or combinations of shapes described above with respect to capacitors 202A-I and cooling tubes 203A-I and FIG. 2.

Figure 4E:
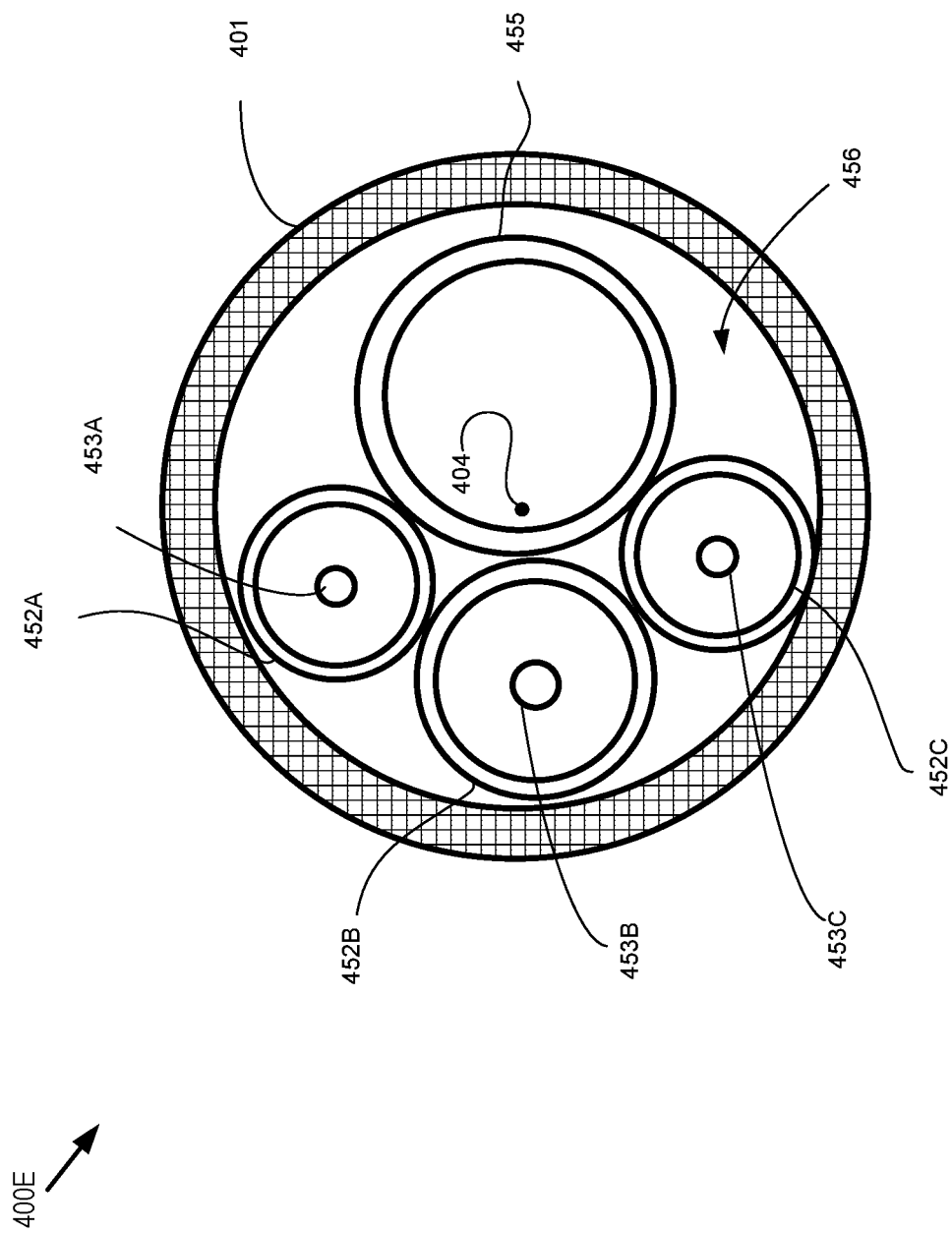
FIG. 4E illustrates a portion of a pulse power drilling assembly shown in cross section relative to a longitudinal axis of the assembly that includes a shifted center flow tube and a plurality of cooling tubes embedded within a plurality of capacitors, according to various embodiments.

FIG. 4E illustrates a portion of a pulse power drilling assembly shown in cross section relative to a longitudinal axis of the assembly that includes a shifted flow tube 455 and a plurality of cooling tubes 453A-C embedded within a plurality of capacitors 452A-C, according to various embodiments. FIG. 4E depicts a capacitor cooling system 400E. System 400E may be arranged in a system that includes additional fluid conduits, manifolds, reservoirs, and/or pump(s) in a same or similar manner as illustrated and described above with respect to FIG. 3. FIG. 4E depicts a system 400E with capacitors 452A-C, embedded with a cooling tube 453A-C, respectively, arranged radially around a flow tube 455 inside a tool body 401.

The flow tube 455 in system 400E is not centered relative to longitudinal axis 404 of the assembly. Instead, the flow tube 455 is off-center from the longitudinal axis 404 of the tool. Shifting the flow tube 455 from the central axis may provide similar benefits to those described with above with respect to the elliptical flow tube 445 of FIG. 4D. The off-center flow-tube 455 of system 400E allows for configurations using larger capacitors or configurations that are not uniform. For example, each of the capacitors 452A-202C are larger capacitors having a cross-sectional shape and/or dimension that would not fit in a configuration with the center flow tube centered around longitudinal axis 404, for example as depicted in FIGS. 4A-4C. While not depicted in FIG. 4E, a positioner, such as positioner 425 of FIG. 4B or positioner 435 of FIG. 4C, or similar, may be used to maintain the alignment of the capacitors 452A-C and the off-center flow tube 455 relative to each other and/or relative to the tool body 401.

In various embodiments, one or more of capacitors 452A-C are in contact with at least one other capacitor that is adjacent to one another. In various embodiments, a portion of the outer surface of each of the capacitors 452A-C is in contact with an inner surface of tool body 401 and/or an outer surface of center flow tube 455. These additional contacts, when present, may aid in the dissipation of heat generated by the capacitors 452A-C. Further, although illustrated as having a circular shape in cross-section in FIG. 4E, embodiments of system 400E may include capacitors and/or cooling tubes, including cooling tubes embedded within capacitors 452A-C, which have some other shape in cross-section besides a circular shape, such as any of the shapes and variations and/or combinations of shapes described above with respect to capacitors 202A-I and cooling tubes 203A-I and FIG. 2.

Figure 5:
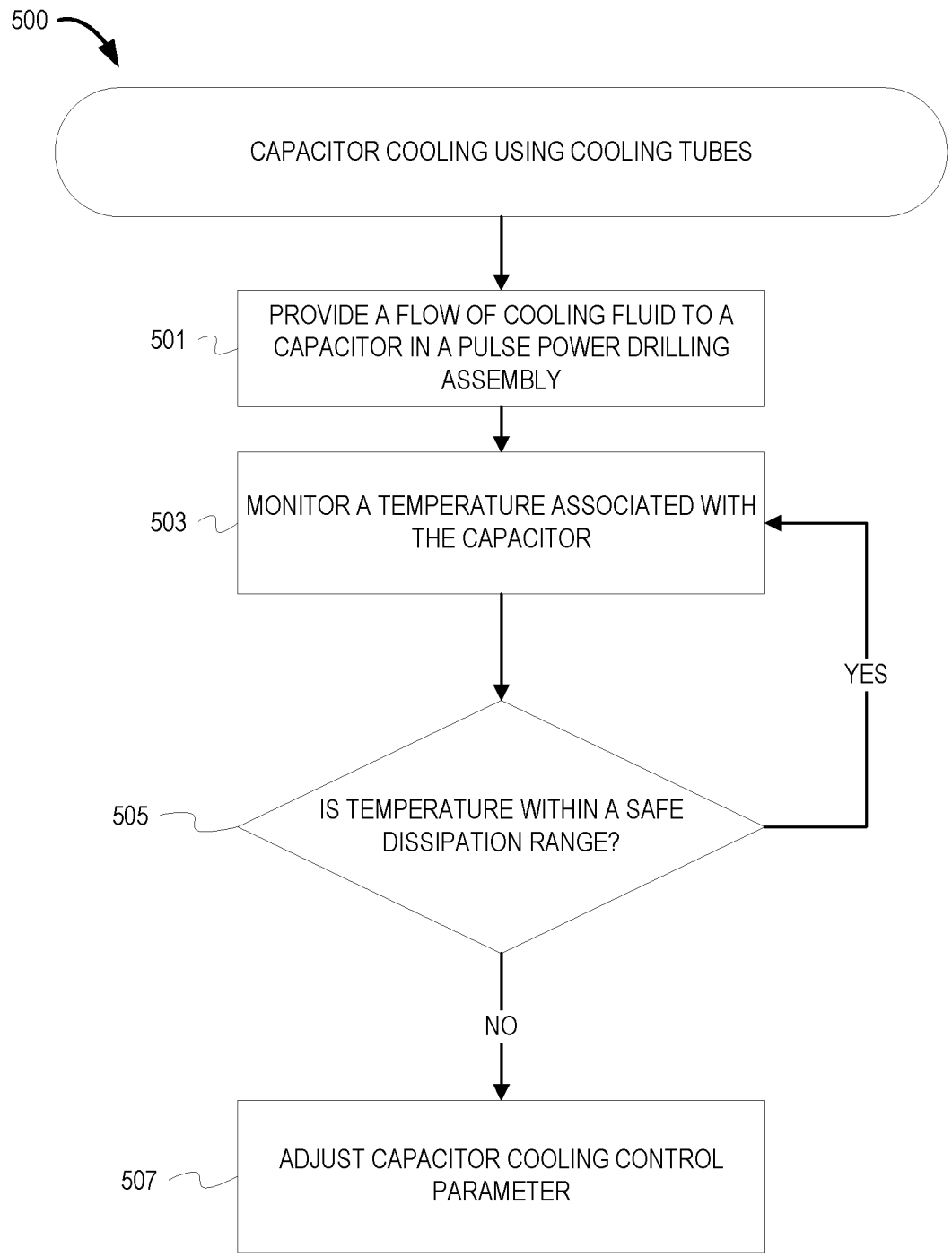
FIG. 5 illustrates a flowchart of operations for capacitor cooling using cooling tubes, according to various embodiments.

FIG. 5 illustrates a flowchart of operations for capacitor cooling using cooling tubes, according to various embodiments. Flowchart 500 depicts operations that may be performed to monitor and adjust cooling fluid flow parameters associated with the cooling of capacitors in downhole pulse power drilling assemblies. The operations of flowchart 500 may be used in conjunction with the pulse power drilling system depicted in FIG. 1 and/or any of the capacitor systems depicted in FIGS. 2-4E. Operations of the flowchart 500 begin at block 501.

At block 501, a flow of cooling fluid is provided to at least one capacitor in a pulse power drilling assembly. The capacitor(s) may be configured to receive, store, and/or discharge electrical energy utilized by the assembly for pulse power drilling operations. The pulse power drilling assembly may be similar to the assembly 101 of FIG. 1, where one or more electrical switching devices, such as switch 116, may be coupled to the capacitor(s), such primary capacitors 117, and configured to control switching of the capacitor(s) into and out of the electrical circuits in order to control the electrical power being generated and utilized by the assembly.

At block 503, a temperature associated with the capacitors(s) is monitored. During pulse power drilling operations, heat is generated within the capacitor. This heat may be dissipated to the surrounding environment. The amount of heat generated depends on the capacitance of the capacitor and the voltage applied to the capacitor. The capacitor may be in fluid communication with the surrounding environment to allow the transfer of heat between the capacitor and the surrounding environment. A cooling tube within the capacitor provides a greater contact surface area between the capacitor and the environment to provide a thermally conductive path for heat generated by or in the vicinity of the capacitors to be removed. A cooling fluid from a cooling fluid reservoir, such as the cooling fluid reservoir 308 of FIG. 3, helps cool the capacitors through contact while also absorbing some of the dissipated heat and transferring the dissipated heat away from the capacitors. One or more sensors on or in the vicinity of the capacitors may be used to monitor the temperature associated with the capacitor(s). For example, the temperature associated with the capacitor(s) may be a temperature of the cooling fluid, the cooling tubes, the capacitor(s), the space around the capacitor(s), and/or a change in the temperature of the drilling fluid passing by the capacitors as it flows through the center flow tube. Other associated temperatures may also be considered. When only one sensor is used, the sensor may monitor a change in temperature at a set location. In a system with multiple sensors, the sensors may be positioned at the opposite ends of the cooling tube to monitor both the change in temperature at each location as well as the difference in temperature between the locations. The monitoring may be continuous or may be periodic with the sensors activated at predefined times.

At block 505, it is determined if the temperature is within a safe dissipation range based on the monitored temperature associated with the capacitor(s). To assess whether a capacitor is at risk of overheating, a safe dissipation range is determined. The safe dissipation range may be a predefined temperature based on the capacitors, or the safe dissipation range may be a set increase from a starting temperature of the cooling fluid. A signal may be sent from the sensors to a pulse power controller indicating the decision of block 505. If the fluid is within the safe dissipation range, operations return to block 503, where the temperature is monitored throughout the pulse power drilling operation. If not, operations continue to block 507.

At block 507, a capacitor cooling control parameter is adjusted. When the cooling temperature is above the safe dissipation range, the capacitor is at risk of overheating, or the capacitor may already be overheating. The signal from block 505 may be received and utilized by one more controllers of the assembly to alter one or more operations associated with the pulsed power drilling operations being performed by the assembly, including one or more operations associated with the generation, processing, storing, and/or discharge of electrical energy associated with the pulse power drilling operations. Capacitor cooling parameters are activated to bring the capacitor down to a safe working temperature to avoid any damage to the capacitors or the assembly. For example, in a system with a pump controlling the flow of cooling fluid, the velocity of the cooling fluid may be increased to provide further cooling for the capacitors. As another example, in a system relying on convection for the flow of cooling fluid, the pulse power controller may signal a shutdown of capacitor charging or delay of charging to allow the capacitor to cool to a safe working temperature. The delay may be a set time with an automatic restart, or the system may be manually restarted to continue charging the capacitors.

Operations of the flowchart 500 may be repeated multiple times throughout the pulse power drilling process. After each adjustment of the capacitor cooling parameter, operations of the flowchart 500 may immediately start again or operations may be scheduled to occur at set times.

FIG. 5 is annotated with a series of numbers/letters. These numbers represent stages of operations. Although these stages are ordered for this example, the stages illustrate one example to aid in understanding this disclosure and should not be used to limit the claims. Subject matter falling within the scope of the claims can vary with respect to the order and some of the operations.

The flowchart is provided to aid in understanding the illustrations and is not to be used to limit scope of the claims. The flowchart depicts example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain or store a program for use by or in connection with an instruction execution system, apparatus, or device. A machine-readable storage medium is not a machine-readable signal medium.

A machine-readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Figure 6:
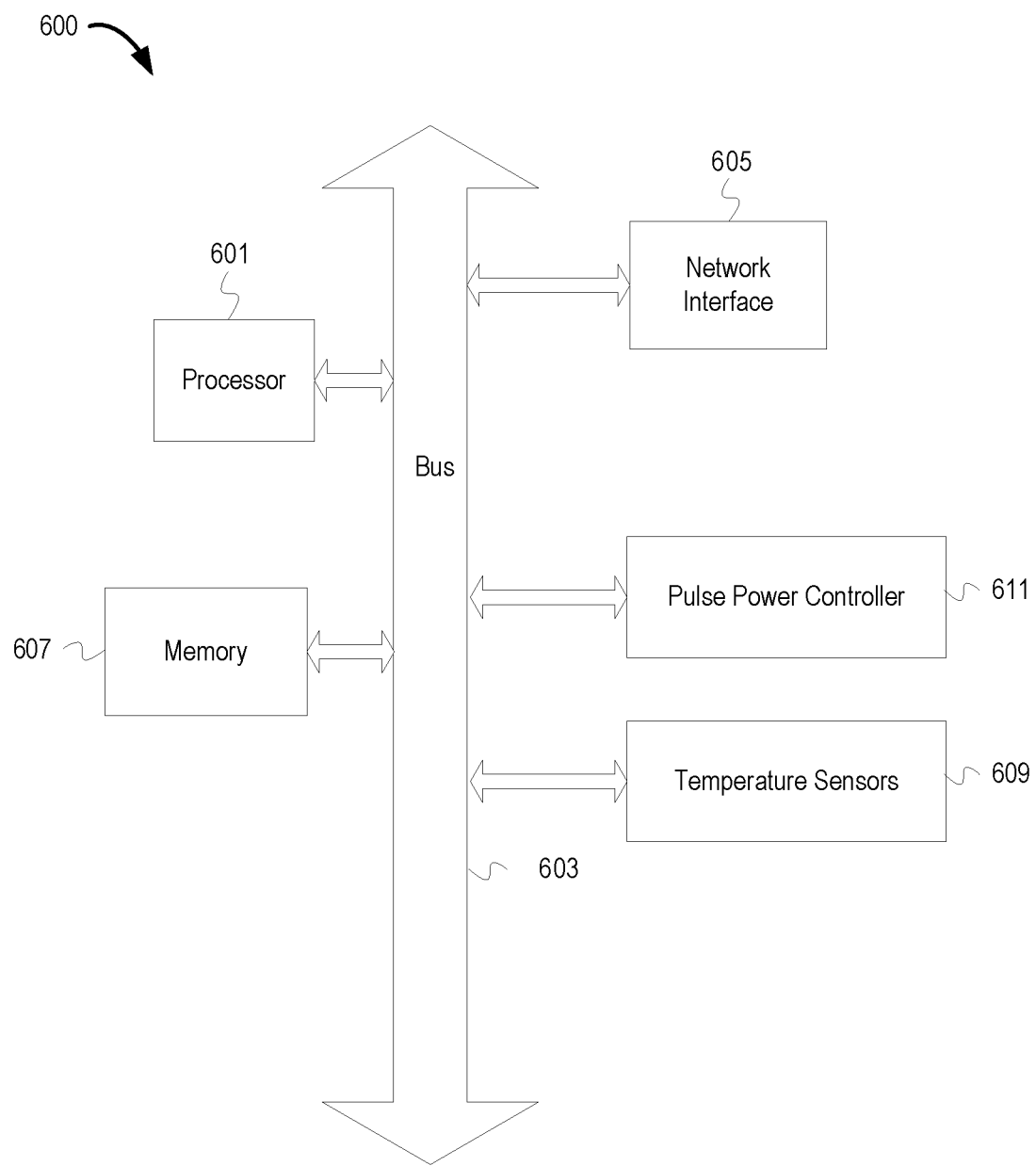
FIG. 6 depicts an example computer system for capacitor cooling using cooling tubes, according to various embodiments.

FIG. 6 depicts an example computer system 600 for capacitor cooling using cooling tubes. The computer system includes a processor 601 (possibly including multiple processors, multiple cores, multiple nodes, and/or implementing multi-threading, etc.). The computer system includes memory 607. The memory 607 may be system memory or any one or more of the above already described possible realizations of machine-readable media. The computer system also includes a bus 603 and a network interface 605. The system communicates via transmissions to and/or from remote devices via the network interface 605 in accordance with a network protocol corresponding to the type of network interface, whether wired or wireless and depending upon the carrying medium. In addition, a communication or transmission can involve other layers of a communication protocol and or communication protocol suites (e.g., transmission control protocol, Internet Protocol, user datagram protocol, virtual private network protocols, etc.). The system also includes pulse power controller 611. The pulse power controller 611 may be substantially similar to the pulse power controller 115 of FIG. 1 and may perform operations of the flowchart 500 of FIG. 5. The system also includes one or more temperature sensors 609 which are confirmed to sense one or more temperatures associated with the capacitors and provide an output signal indicative of the sensed temperature. Computer system 600 (processor 601) is configured receive the output signal(s) from the temperature sensors 609, and to monitor the sensed temperature, and to generate and output signal, such as an alarm signal, when the temperate is out of range or exceed a pre-determined threshold level. System 600 may be configured to take on or more other actions, for example by providing control commands to pulsed power controller 611, when the alarm signal has been generated. An output may also be provided via network interface 605 that is communicated to an external device, such as a display screen or another computer that is designed to provide an indication to a user that the over temperature condition has occurred, and may include data, such as time and temperature data associated with the monitored temperatures and/or the overtemperature condition. Any one of the previously described functionalities may be partially (or entirely) implemented in hardware and/or on the processor 601. For example, the functionality may be implemented with an application specific integrated circuit, in logic implemented in the processor 601, in a co-processor on a peripheral device or card, etc. Further, realizations may include fewer or additional components not illustrated in FIG. 6 (e.g., video cards, audio cards, additional network interfaces, peripheral devices, etc.). The processor 601 and the network interface 605 are coupled to the bus 603. Although illustrated as being coupled to the bus 603, the memory 607 may be coupled to the processor 601.

While the aspects of the disclosure are described with reference to various implementations and exploitations, it will be understood that these aspects are illustrative and that the scope of the claims is not limited to them. In general, techniques for capacitor cooling using cooling tubes as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

EXAMPLE EMBODIMENTS

An apparatus comprises a flow tube within a tool body of a pulse power drilling assembly. The flow tube is configured to provide a flow path for drilling fluid through one or more sub-assemblies of the pulse power drilling assembly. One or more capacitors are positioned between the flow tube and the tool body. Each of the one or more capacitors comprises a cooling tube embedded within the capacitor to provide a thermally conductive path for removal of heat associated with the one or more capacitors.

In some embodiments, a flow of fluid from a reservoir is provided within each of the cooling tubes. In some embodiments, a return line is provided to recirculate the flow of fluid back to the reservoir. In some embodiments, the reservoir comprises the drilling fluid flowing through drilling flow tube within the tool body. In some embodiments, the reservoir comprises a drilling fluid outside of the tool body in an annulus between a formation and the tool body. In some embodiments, the fluid reservoir comprises a pressure compensation fluid filling the tool body. In some embodiments, the reservoir comprises a cooling fluid reservoir comprising a dedicated cooling fluid separate from any other fluid in the tool body.

In some embodiments, a solid material extends at least part of a distance between the flow tube and the tool body and surrounding the one or more capacitors to maintain a position of the one or more capacitors and to absorb at least part of the heat associated with the one or more capacitors. In some embodiments, one or more cooling tubes are embedded within the solid material.

In some embodiments, the flow tube comprises one of a center flow tube with the one or more capacitors are uniformly arranged radially around the center flow tube, an off-center flow tube, and an elliptical flow tube.

A method comprises providing a flow of cooling fluid to a cooling tube embedded in a capacitor in a pulse power drilling assembly. The capacitor is configured to store and control electrical energy utilized by the pulse power drilling assembly to perform pulse power drilling operations. The cooling tube provides a thermally conductive path for heat associated with the capacitor to be removed.

In some embodiments, the method further comprises monitoring a temperature associated with the capacitor and providing an output signal indicative of the temperature. The provided output signal is indicative of the temperature exceeding a predetermined threshold temperature.

In some embodiments, the method further comprises adjusting a control parameter associated with the flow of cooling fluid. The control parameter comprises at least one of a signal to increase a velocity of the cooling fluid flowing through the cooling tube of each of the one or more capacitors, a signal to delay charging of the capacitor, and a signal to shut down the pulse power drilling assembly.

A system comprises a flow tube within a tool body of a pulse power drilling assembly. The flow tube is configured to provide a flow path for drilling fluid through one or more sub-assemblies of the pulse power drilling assembly. One or more capacitors are positioned between the flow tube and the tool body. Each of the one or more capacitors comprises a cooling tube within the capacitor to provide a thermally conductive path for heat associated with the capacitor to be removed. A reservoir is connected in fluid communication with the cooling tube to allow a flow of fluid from the reservoir to the cooling tube, and a cooling device is in thermal contact with the flow tube to cool the flow of fluid.

In some embodiments, the system further comprises a pump to control the flow of fluid. In some embodiments, the system further comprises a return line to recirculate the flow of fluid back to the cooling device. In some embodiments, the system further comprises a solid material extending at least part of a distance between the flow tube and the tool body and surrounding the one or more capacitors to maintain the position of the one or more capacitors and to absorb at least part of the heat associated with the one or more capacitors. In some embodiments, one or more cooling tubes are embedded within the solid material. The flow tube is one of a center flow tube with the one or more capacitors uniformly arranged radially around the center flow tube, an off-center flow tube, or an elliptical flow tube.

What is claimed is:

1. An apparatus comprising:
   a flow tube within a tool body of a pulse power drilling assembly, the flow tube configured provide a flow path for drilling fluid through one or more sub-assemblies of the pulse power drilling assembly;
   one or more capacitors positioned between the flow tube and the tool body, each of the respective one or more capacitors including a cooling tube embedded within the capacitor and connected to an external source of cooling fluid that is external to the cooling tube, the cooling tube configured to provide a thermally conductive path for the cooling fluid to flow from the external source through the respective capacitor and remove heat from the respective capacitor.

2. The apparatus of claim 1, wherein the external source of cooling fluid includes a reservoir fluidically coupled with the cooling tubes.

3. The apparatus of claim 2, further comprising a return line to recirculate the cooling fluid back to the reservoir.

4. The apparatus of claim 2, wherein the cooling fluid includes the drilling fluid.

5. The apparatus of claim 2, wherein the cooling fluid is the drilling fluid which is configured to flow outside of the tool body in an annulus between a formation and the tool body.

6. The apparatus of claim 2, wherein the reservoir includes a pressure compensation fluid configured to fill the tool body.

7. The apparatus of claim 2, wherein the reservoir comprises a cooling fluid reservoir comprising a dedicated cooling fluid separate from any other fluid in the tool body.

8. The apparatus of claim 1, further comprising a solid material extending at least part of a distance between the flow tube and the tool body and surrounding the one or more capacitors to maintain a position of the one or more capacitors and to absorb at least part of the heat associated with the one or more capacitors.

9. The apparatus of claim 8, wherein one or more cooling tubes are embedded within the solid material.

10. The apparatus of claim 1, wherein the flow tube comprises one of a center flow tube with the one or more capacitors are uniformly arranged radially around the center flow tube, an off-center flow tube, and an elliptical flow tube.

11. A method for cooling a capacitor in a pulse power drilling assembly by flowing cooling fluid through a cooling tube, the method comprising:
   providing, from a source of cooling fluid external to the cooling tube, a flow of the cooling fluid through the cooling tube embedded in the capacitor in the pulse power drilling assembly, wherein the cooling tube provides a path for the cooling fluid to flow and remove heat from the capacitor, and
   wherein the capacitor is configured to store and control electrical energy utilized by the pulse power drilling assembly to perform pulse power drilling operations.

12. The method of claim 11, further comprising:
   monitoring a temperature associated with the capacitor; and
   providing an output signal indicative of the temperature.

13. The method of claim 12, wherein the provided output signal is indicative of the temperature exceeding a predetermined threshold temperature.

14. The method of claim 13, further comprising adjusting a control parameter associated with the flow of cooling fluid, wherein the control parameter comprises at least one of a signal to increase a velocity of the cooling fluid flowing through the cooling tube of each of the one or more capacitors, a signal to delay charging of the capacitor, and a signal to shut down the pulse power drilling assembly.

15. A system comprising:
   a flow tube within a tool body of a pulse power drilling assembly, the flow tube configured provide a flow path for drilling fluid through one or more sub-assemblies of the pulse power drilling assembly;
   one or more capacitors positioned between the flow tube and the tool body, wherein each of the one or more capacitors comprises a cooling tube within the capacitor to provide a thermally conductive path for heat associated with the capacitor to be removed;
   a reservoir connected in fluid communication with the cooling tube to allow a flow of fluid from the reservoir to the cooling tube; and
   a cooling device in thermal contact with the flow tube to cool the flow of fluid.

16. The system of claim 15, further comprising a pump to control the flow of fluid.

17. The system of claim 15, further comprising a return line to recirculate the flow of fluid back to the cooling device.

18. The system of claim 15, further comprising a solid material extending at least part of a distance between the flow tube and the tool body and surrounding the one or more capacitors to maintain the position of the one or more capacitors and to absorb at least part of the heat associated with the one or more capacitors.

19. The system of claim 18, wherein one or more cooling tubes are embedded within the solid material.

20. The system of claim 15, wherein the flow tube is one of a center flow tube with the one or more capacitors uniformly arranged radially around the center flow tube, an off-center flow tube, or an elliptical flow tube.

* * * * *